United States Patent [19]
Manz

[11] Patent Number: 5,005,369
[45] Date of Patent: Apr. 9, 1991

[54] REFRIGERANT PURIFICATION WITH AUTOMATIC AIR PURGE

[75] Inventor: Kenneth W. Manz, Paulding, Ohio
[73] Assignee: Kent-Moore Corporation, Warren, Mich.
[21] Appl. No.: 463,449
[22] Filed: Jan. 11, 1990

Related U.S. Application Data

[63] Continuation-in-part of Ser. No. 405,236, Sep. 11, 1989, abandoned.

[51] Int. Cl.$^5$ .............................................. F25B 43/04
[52] U.S. Cl. ........................................ 62/195; 62/85; 62/149; 62/475
[58] Field of Search ................ 62/195, 85, 474, 475, 62/77, 149, 125, 127, 129

[56] References Cited

U.S. PATENT DOCUMENTS

| | | | |
|---|---|---|---|
| 1,525,006 | 2/1925 | Shipley | 62/475 X |
| 2,475,218 | 7/1949 | Campbell | 62/475 X |
| 3,313,121 | 4/1967 | Barbier | 62/197 |
| 4,417,451 | 11/1983 | Spauschus | 62/475 X |
| 4,476,688 | 10/1984 | Goddard | 62/475 X |
| 4,484,453 | 11/1984 | Niess | 62/195 |
| 4,768,347 | 9/1988 | Manz et al. | 62/149 |

Primary Examiner—Harry B. Tanner
Attorney, Agent, or Firm—Barnes, Kisselle, Raisch, Choate, Whittemore & Hulbert

[57] ABSTRACT

A system for purification of refrigerant within a storage container includes a filter/dryer for removing contaminants' from refrigerant passing therethrough, and a refrigerant pump connected to the storage container to circulate refrigerant in a closed path from the container through the filter/dryer and return the refrigerant to the container. The system configuration is such that the refrigerant is in liquid phase in at least a portion of the closed path. A pressure-differential valve has an inlet coupled to a purge port on the container for receiving air captured within the container. Container air pressure at the valve inlet is fed to one side of a flexible diaphragm. Circulating liquid refrigerant is passed in heat transfer contact with a sealed enclosure containing liquid refrigerant, so that the refrigerant within the enclosure is at saturation pressure and acts on the opposing side of the diaphragm in conjunction with a valve spring. The diaphragm is coupled to a valve element that lifts from a valve seat to connect the valve inlet to an outlet, and thereby vent air from within the storage container, whenever container air pressure exceeds refrigerant saturation pressure by a threshold that is determined in part by the valve spring.

18 Claims, 4 Drawing Sheets

REFRIGERANT PURIFICATION WITH AUTOMATIC AIR PURGE

This application is a continuation-in-part of application Ser. No. 07/405,236 filed Sept. 11, 1989, abandoned. p The present invention is directed to refrigerant handling systems, and more particularly to a device for purging air from within a liquid refrigerant storage container.

BACKGROUND AND OBJECTS OF THE INVENTION

U.S. Pat. No. 4,768,347, assigned to the assignee hereof, discloses a refrigerant recovery system that includes a compressor having an inlet coupled through an evaporator and through a solenoid valve to the refrigeration equipment from which refrigerant is to be withdrawn, and an outlet coupled through a condenser to a refrigerant storage container or tank. The evaporator and condenser are contained within a closed cylindrical canister for heat exchange and oil separation, the canister having an oil drain in the bottom. The refrigerant storage container is carried by a scale having a limit switch coupled to control electronics to prevent or terminate further refrigerant recovery when the container is full. The scale comprises a platform pivotally mounted by a hinge pin to a wheeled cart, which also carries the evaporator/condenser unit, compressor, control electronics and associated valves and hoses.

U.S. Pat. No. 4,805,416, also assigned to the assignee hereof, discloses systems for recovering, purifying and recharging refrigerant in which, during a purification cycle, refrigerant is circulated from the refrigerant storage container in a closed path through a circulation valve and a filter for removing water and other contaminants, and then returned to the container. U.S. application Ser. No. 263,887, filed Oct. 28, 1988 and also assigned to the assignee hereof, discloses a refrigerant recovery system that includes a refrigerant storage container, refrigeration circuitry for withdrawing refrigerant from equipment under service and feeding such refrigerant to the container for storage, and a scale supporting the container for sensing impending overfill of the container. The scale includes a beam horizontally rigidly cantilevered from a base. A switch is positioned adjacent to the cantilever-remote end of the beam, and is responsive to resilient deflection of the beam to indicate impending overfill of the container and prevent or terminate operation or the refrigerant recovery system.

A problem with refrigeration service devices of the subject character lies in potential entrapment of air in the air conditioning system being serviced. All refrigerants, including R-12 (dichlorodifluoromethane), have characteristic saturation pressures that vary as associated functions of temperature as long as refrigerant is present in both liquid and vapor phases, such as in the refillable storage container of a refrigerant recovery, purification and/or recharging station. If air is present in the system or container, a differential pressure above the saturation pressure is created, which is proportional to the quantity of air. However, absorption of air is undesirable in an air conditioning system in that it displaces cooling capacity, causes higher operating temperatures and pressures, and reduces operating life of compressor components. Automotive vehicle manufacturers have set a limit on the amount of air permissible in a refillable storage container after recovery and recycling (such as through a filter/dryer) and prior to recharging into a vehicle. Commercial air conditioning and refrigeration system manufacturers are expected to establish similar limits.

It is therefore a general object of the present invention to provide a refrigerant handling system and method that include facility for purging trapped air from the system. A more specific object of the invention is to provide a system and method for circulating liquid refrigerant to a storage container that include facility for automatically purging air from within the container when the differential air pressure within the container exceeds saturation pressure of refrigerant within the system by more than a preselected threshold. Yet another and more specific object of the invention is to provide a liquid refrigerant purification system that includes a refrigerant storage container, a pump coupled to the container for circulating liquid refrigerant from the container through a filter/dryer and then returning the refrigerant to the container, and a purging valve for automatically venting air from the container when the air/saturation pressure differential exceeds a prespecified threshold.

SUMMARY OF THE INVENTION

A refrigerant handling system in accordance with the present invention includes a closed liquid refrigerant storage container and a pump for feeding refrigerant to the container so as to capture air in the container over the refrigerant. Saturation pressure of refrigerant fed to the container is determined as a function of refrigerant temperature, and a pressure differential is determined between the temperature-dependent saturation pressure of the liquid refrigerant and the air trapped within the storage container. The trapped air is vented from the closed volume when such pressure differential exceeds a preselected threshold. Refrigerant saturation pressure preferably is determined by directing the refrigerant, preferably in liquid phase, in heat-transfer relationship with refrigerant captured in a sealed enclosure, such that pressure of the refrigerant within the enclosure varies as direct function of saturation pressure of the liquid refrigerant fed to the closed volume.

In a presently preferred implementation of the invention, a system for purification of refrigerant within a storage container includes a filter/dryer for removing water and other contaminates from refrigerant passing therethrough, and a refrigerant pump connected to the storage container to circulate refrigerant in a closed path from the container through the filter/dryer and return the refrigerant to the container. The system configuration is such that the refrigerant is in liquid phase in at least a portion of the closed path. A pressure-differential valve has an inlet coupled to a purge port on the container for receiving air captured within the container. Container air pressure at the valve inlet is fed to one side of a flexible diaphragm. Circulating liquid refrigerant is passed in heat transfer contact with a enclosure containing liquid refrigerant, so that the refrigerant within the enclosure is at saturation pressure of the circulating liquid refrigerant and acts on the opposing side of the diaphragm in conjunction with a valve spring. The diaphragm is coupled to a valve element that lifts from a valve seat to connect the valve inlet to an outlet, and thereby vent air from within the storage container, whenever container air pressure exceeds refrigerant saturation pressure by a threshold that is determined in part by the valve spring.

In modified embodiments of the invention, a pressure differential gauge is connected to the saturation pressure sensor and to the container. The gauge has a dial indicator with either a pair of needles for indicating saturation pressure and container air pressure, or a single needle for indicating pressure differential. A manual valve is coupled to the container for activation by an operator when the pressure differential indicated by the gauge exceeds the desired threshold.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
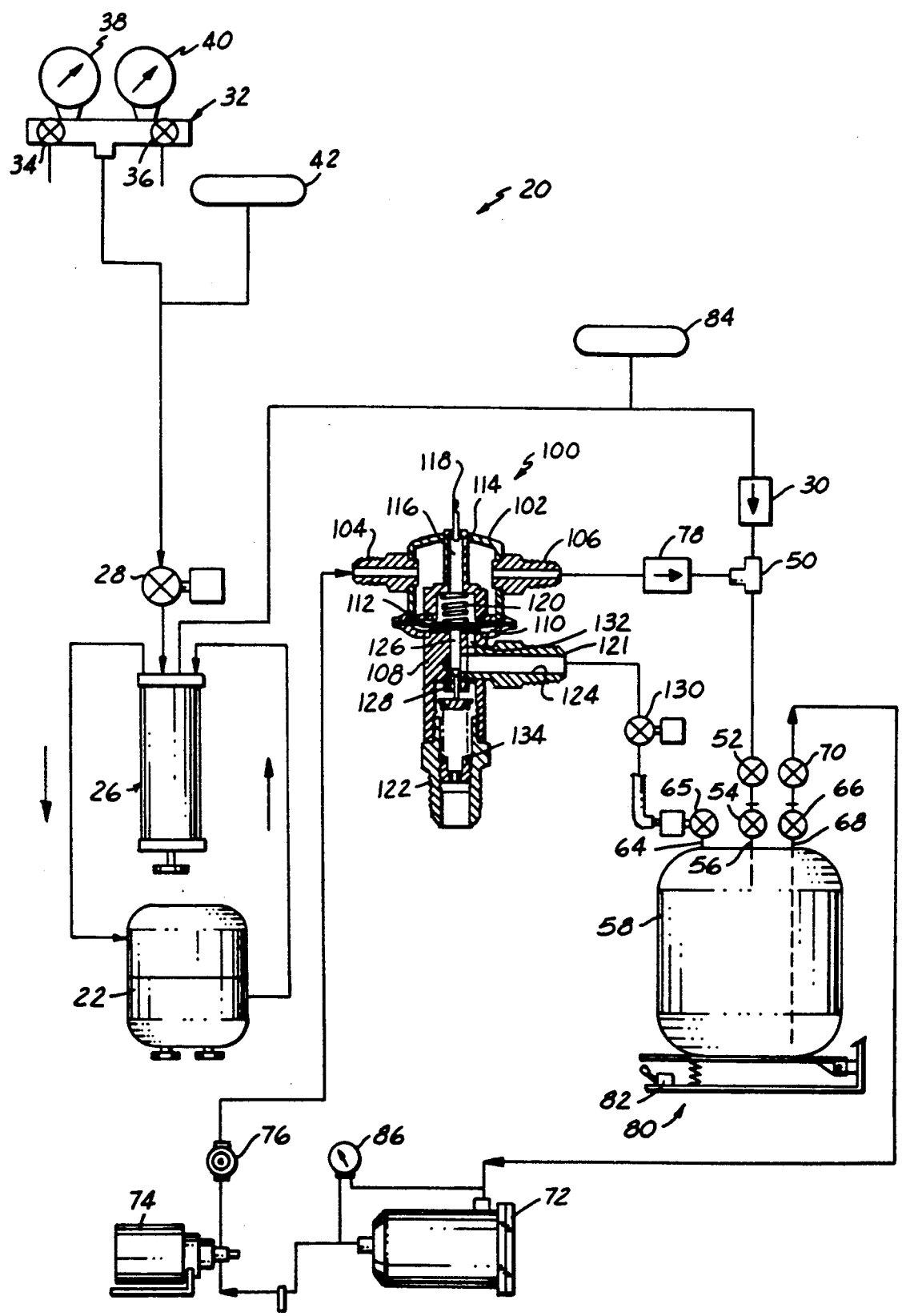
FIG. 1 is a schematic diagram of a refrigerant recovery and purification system in accordance with one presently preferred implementation of the invention.

FIG. 1 illustrates one presently preferred implementation of a refrigerant recovery and purification system 20 in accordance with the present invention as comprising a compressor 22 having an inlet that is coupled to an input manifold 32 through a recovery control solenoid valve 28 and the evaporator section of a combined heat-exchange oil-separation unit 26. Manifold 32 includes facility for connection to the high pressure and low pressure sides of a refrigeration system from which refrigerant is to be recovered. Manifold 32 also includes the usual manual valves 34, 36 and pressure gauges 38, 40. A pressure switch 42 is connected between solenoid valve 28 and manifold 32, and is responsive to a predetermined low pressure to the compressor inlet from the refrigeration system to indicate removal or recovery of refrigerant therefrom. The outlet of compressor 22 is connected through the condenser portion of unit 26, through a check valve 30, a tee 50 and a pair of manual valves 52, 54, to the vapor inlet port 56 of a refrigerant storage container 58. Container 58 is of conventional construction, and includes a pressure relief port 64 with manual valve 65 and a liquid port 68 with manual valve 66. A suitable container 58 is marketed by Manchester Tank Company under the trademark Ultraline and includes valves 54, 65, 66.

A pressure switch 84 is connected between unit 26 and check valve 30, and is responsive to vapor pressure within container 58 with valves 52, 54 open to indicate an excessive vapor pressure of predetermined level therewithin. Container 58 is carried by a scale 80 that has a switch 82 for indicating impending overfill of the container. Liquid port valve 66 is connected through a manual valve 70 to the inlet of a replaceable-core filter/dryer unit 72 of any suitable conventional type. The outlet of filter/dryer 72 is connected to tee 50 through a liquid refrigerant pump 74, a moisture indicator 76 and a check valve 78. A differential pressure gauge 86 is connected across filter/dryer unit 72 to indicate pressure drop across unit 72 above a preselected threshold, which may be marked on the pressure indicator, and thereby advise an operator to replace the filter/dryer core of unit 72.

In operation, manifold 32 is first connected to a refrigeration system—e.g., an air conditioning system or a heat pump system—from which refrigerant is to be recovered. With container 58 connected as shown, and with manual valves 52, 54 open, solenoid valve 28 and compressor 22 are energized by the control electronics in an initial refrigerant recovery mode of operation. Refrigerant is thereby drawn from the refrigeration system to which manifold 32 is connected through valve 28 and the evaporator section of unit 26 to the inlet of compressor 22. Recovered refrigerant is fed from the compressor outlet through the condenser section of unit 26, where heat is exchanged with input refrigerant to evaporate the latter and to condense the former, and thence through valve 30 to tank 58. When substantially all refrigerant has been withdrawn from the refrigeration system to which manifold 32 is connected, recovery pressure switch 42 indicates a low system pressure condition to the control electronics, which then closes valve 28 and shuts down compressor 22.

In a refrigerant purification mode of operation, valves 66, 70 are opened. Pump 74 is then energized to circulate liquid refrigerant from container 58 at liquid port 68, through filter/dryer unit 72 and moisture indicator 76, and thence returned to vapor port 56 of container 58 through tee 50 and valves 52, 54. This operation continues until indicator 76 indicates removal of all moisture from the liquid refrigerant, at which time operation is terminated. To the extent thus far described, system 20 is similar to that disclosed in above-identified U.S. Pat. No. 4,768,347, the disclosure of which is incorporated herein by reference.

In accordance with the present invention, a pressure differential valve 100 is connected in the liquid refrigerant return line between indicator 76 and check valve 78, and to purge port 64 of container 58, for venting air captured within container 58 when the container air pressure exceeds liquid refrigerant saturation pressure by more than a preselected threshold. More specifically, valve 100 includes a cup-shaped dome or cap 102 having diametrically opposed radially outwardly projecting inlet and outlet fittings 104, 106 respectively connected to indicator 76 and check valve 78. Cap 102 is mounted on a base 108 and cooperates therewith to form a chamber 110 in which a diaphragm 112 is flexibly peripherally mounted. A cup 114 is mounted within cap 102, and cooperates with cap 102 and diaphragm 112 to form a sealed chamber 116. A nipple 118 affords access to chamber 116 for filling the chamber with liquid refrigerant. A coil spring 120 is captured in compression within chamber 116 between diaphragm 112 and an opposing shoulder of cup 114. An inlet fitting 121 projects radially from base 108 and cooperates with an axially extending outlet fitting 122 to form a passage 124 extending through base 108. A valve stem 126 extends from diaphragm 112 into base 108 coaxially with outlet fitting 122. A valve seat 128 in passage 124 opposes valve stem 126 for selectively opening and closing passage 124 as a function of position of diaphragm 112. A solenoid valve 130 is connected between valve 65 and inlet fitting 121. A passage 132 in base 108 connects inlet 121 to the underside of diaphragm 112 in chamber 110.

A spring 134 in base 108 urges valve stem 126 against diaphragm.

Chamber 116 is initially filled with refrigerant of the same type in connection with which system 20 is to be employed, such as R-12 refrigerant. In this way, the saturation pressure/temperature characteristics of the refrigerant within chamber 116 match those of the refrigerant flowing through the system. When liquid refrigerant is circulated by pump 74 through filter/dryer unit 72 from and to container 58, such liquid refrigerant passing through cap 102 of valve 100 transfers heat to the refrigerant captured within chamber 116, which thus assumes the temperature of the circulating liquid refrigerant. Since saturation pressure of liquid refrigerant varies as a direct and known function of refrigerant temperature, the pressure of refrigerant within chamber 116 against diaphragm 112 thus necessarily varies as a direct function of temperature of refrigerant within chamber 116, and thus as a function of temperature of refrigerant circulating through valve 100. At the same time, with valve 65 open and solenoid valve 130 energized, the pressure of air and refrigerant vapor within container 58 is fed to the underside of diaphragm 112 through passage 132 in base 108. When the air pressure exceeds the refrigerant saturation pressure within chamber 116 by a threshold amount corresponding to the pressure differential of springs 120, 134 on diaphragm 112, valve stem 126 is lifted from seat 128 and the air within container 58 is purged through valve 110 to atmosphere.

Spring 134 is adjustably mounted in base 108, so that the pressure differential between springs 120, 134 on diaphragm 112 may be adjusted. By way of example, the setting of springs 120, 134 may correspond to a pressure differential of 6 to 7½ psi for opening valve 100. In the same way, the spring pressure could be set to close valve 100 at a pressure differential of 2½ to 3½ psi. This is equivalent to a 4° F. change in refrigerant temperature. Solenoid valve 130 is automatically closed after a predetermined time duration to prevent unintended refrigerant vapor losses.

Figure 2:
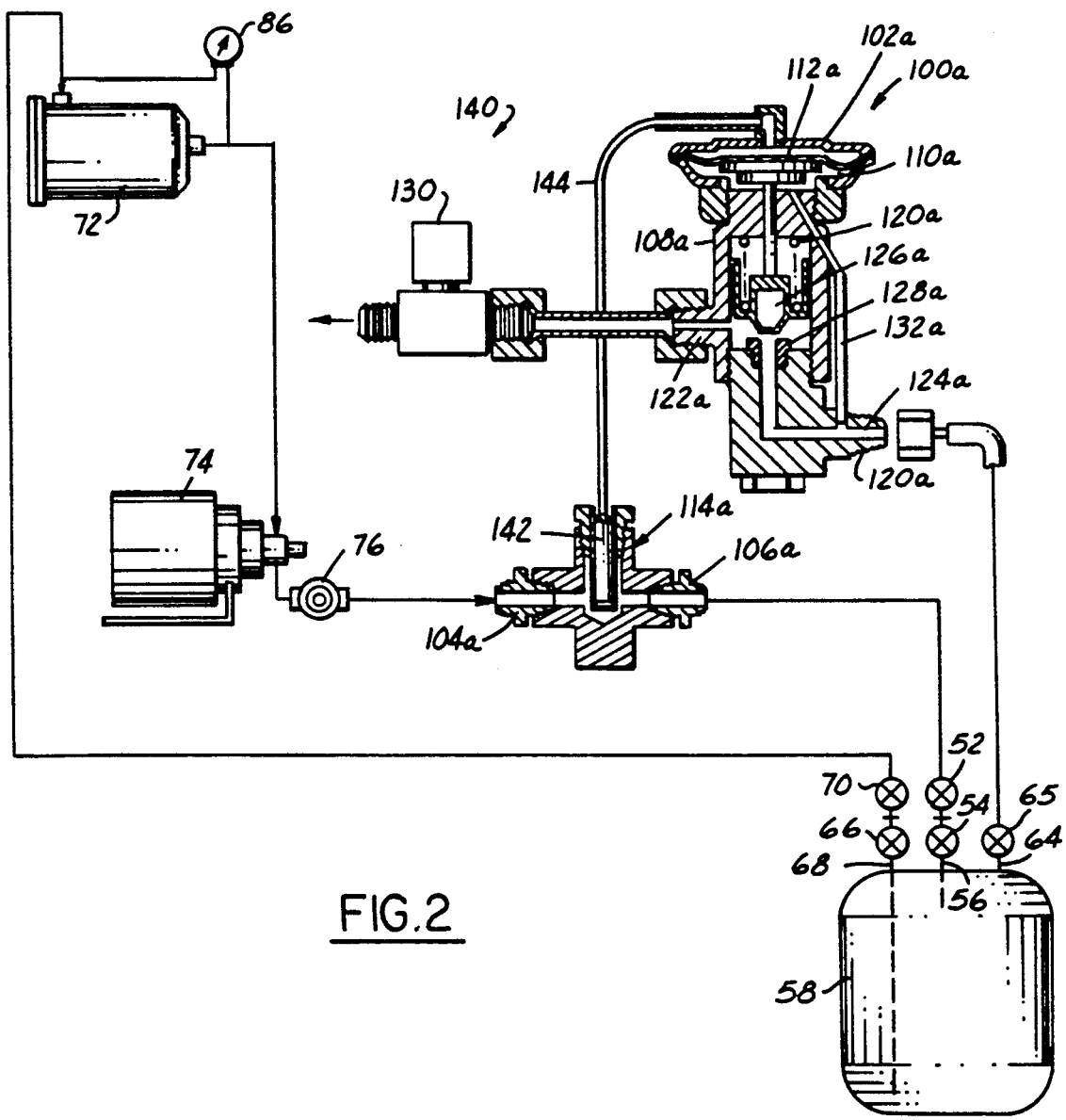
FIG. 2 is a schematic diagram of a liquid refrigerant purification system in accordance with another preferred implementation of the invention.

FIG. 2 illustrates a modified embodiment of the invention in which a liquid refrigerant purification system 140 is provided as a separate unit, as disclosed for example in U.S. Pat. Nos. 4,768,347. Reference numerals in FIG. 2 identical to those in FIG. 1 indicate identical components, and reference numerals followed by the suffix "a" indicate functionally equivalent components. Chamber 114a for indicating refrigerant saturation pressure as a function of refrigerant temperature is separated from the mechanical structure of pressure differential valve 100a. A bulb 142 containing liquid refrigerant is connected by a tube 144 to the upper chamber of valve 100a over diaphragm 112a. Coil spring 120a is captured within valve base 108a to urge valve element 126a against seat 128a. A conduit 132a connects base inlet fitting 120a to the chamber below diaphragm 112a, and solenoid valve 130 is connected to outlet 122a rather then to inlet 120a. Purification system 140 and valve 100a operate in the same manner as previously described in conjunction with the combined recovery and purification system 20 of FIG. 1.

Although the saturation/air pressure-differential feature that characterizes the present invention has been described in detail in conjunction with two implementations thereof in liquid refrigerant purification systems, it will be recognized that the principles of the invention are in no way limited to the details of these to specific embodiments. Indeed, the principles of the present invention may be implemented in any liquid refrigerant circulation system in which air/vapor pressure within a contained volume should be addressed. For example, in a refrigerant recovery system that does not include purification capability, valve 100 may be connected between check valve 30 and valve 52 (FIG. 1) so as to be responsive to temperature of liquid refrigerant from the condenser portion of unit 26 for purging air from within container 50 during the refrigerant recovery process. Several valves 100, in combination with suitable switch/solenoid controls, may be employed for use in conjunction with multiple differing types of refrigerant in the same system. Likewise, although an essentially mechanical air/saturation pressure differential valve is presently preferred for reasons of economy and reliability, a solenoid valve in conjunction with electronic sensors responsive to refrigerant saturation pressure and air pressure could be employed in accordance with the principles of the invention in their broadest aspects.

Figure 3:
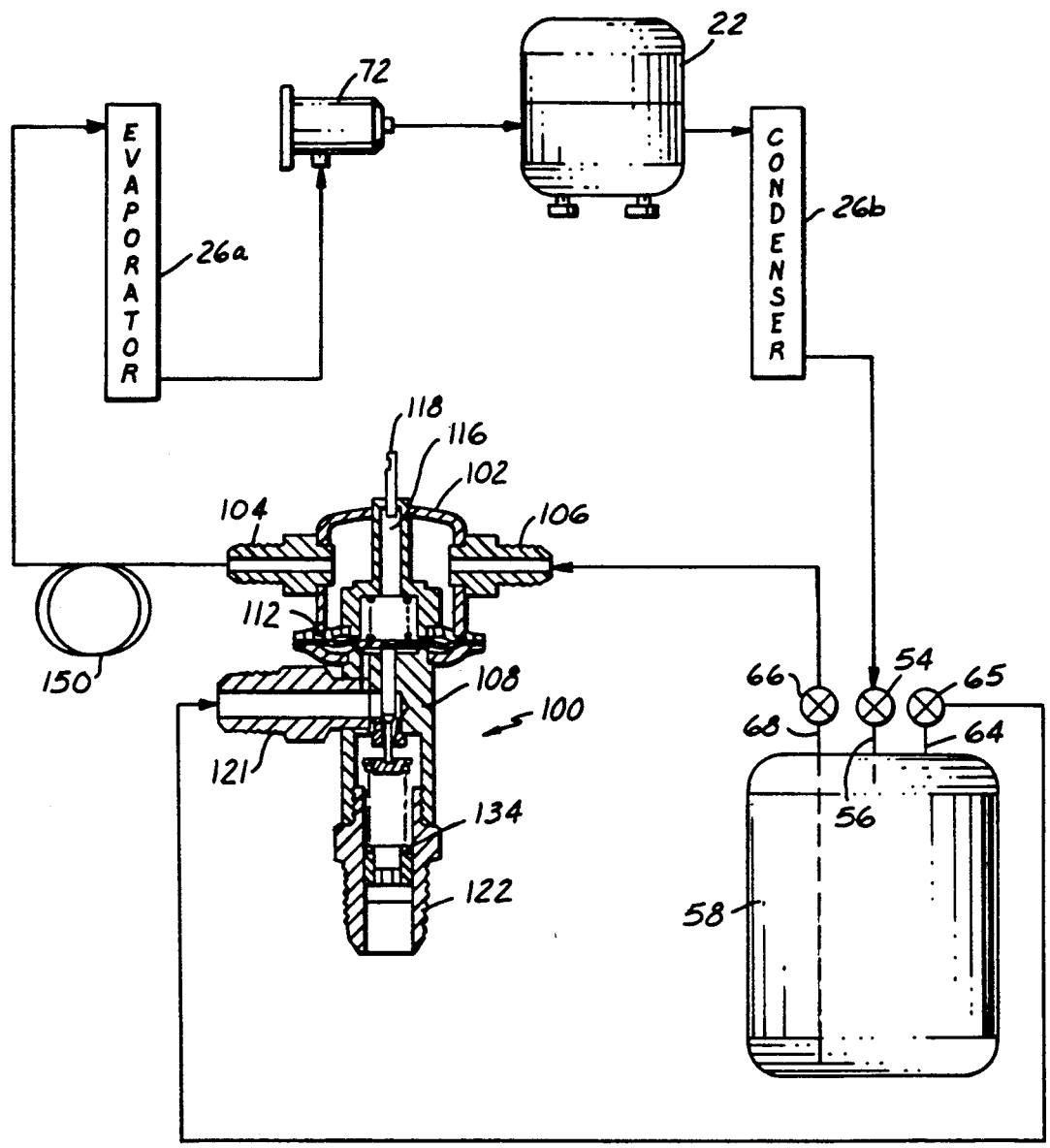
FIG. 3 is a schematic diagram of a modified refrigerant purification system in accordance with yet another embodiment of the invention.

FIG. 3 illustrates yet another implementation of the invention in conjunction with a refrigerant purification system of the type disclosed in above-noted U.S. Pat. No. 4,805,416. Compressor 22 serves as the pump for circulating refrigerant in a closed path through filter 72 from and to container 58. In the embodiment of FIG. 3, refrigerant from container liquid port 68 is circulated through an expansion device 150, such as a capillary tube, orifice tube, automatic expansion valve, or thermostatic expansion valve to the inlet of an evaporator 26a. The outlet of evaporator 26a is fed to the inlet of compressor 22, while the outlet of compressor 22 is connected to the inlet of condenser 26b, and thence to vapor port 56 to container 58. Evaporator 26a and condenser 26b may be either separate units as illustrated in FIG. 3, or combined in a single assembly 26 as illustrated in FIG. 1. Valve 100 may be connected anywhere in the closed refrigerant path where the refrigerant exists in liquid phase or substantially in liquid phase, such as between port 68 and expansion device 50 as shown in FIG. 3, between condenser 26b and port 56, or between expansion device 50 and evaporator 26a where the refrigerant would be at least 90% liquid. Likewise, filter 72 may be connected anywhere in the refrigerant loop, such as between evaporator 26a and compressor 22 as illustrated in FIG. 3.

In the embodiments of FIGS. 1 and 2, where the refrigerant circulating in the closed purification path is substantially entirely in liquid phase, valve 100 or 100a may be connected anywhere in the circulation loop. Connection adjacent to the return port to the refrigerant container is preferred, but not essential.

Figure 4:
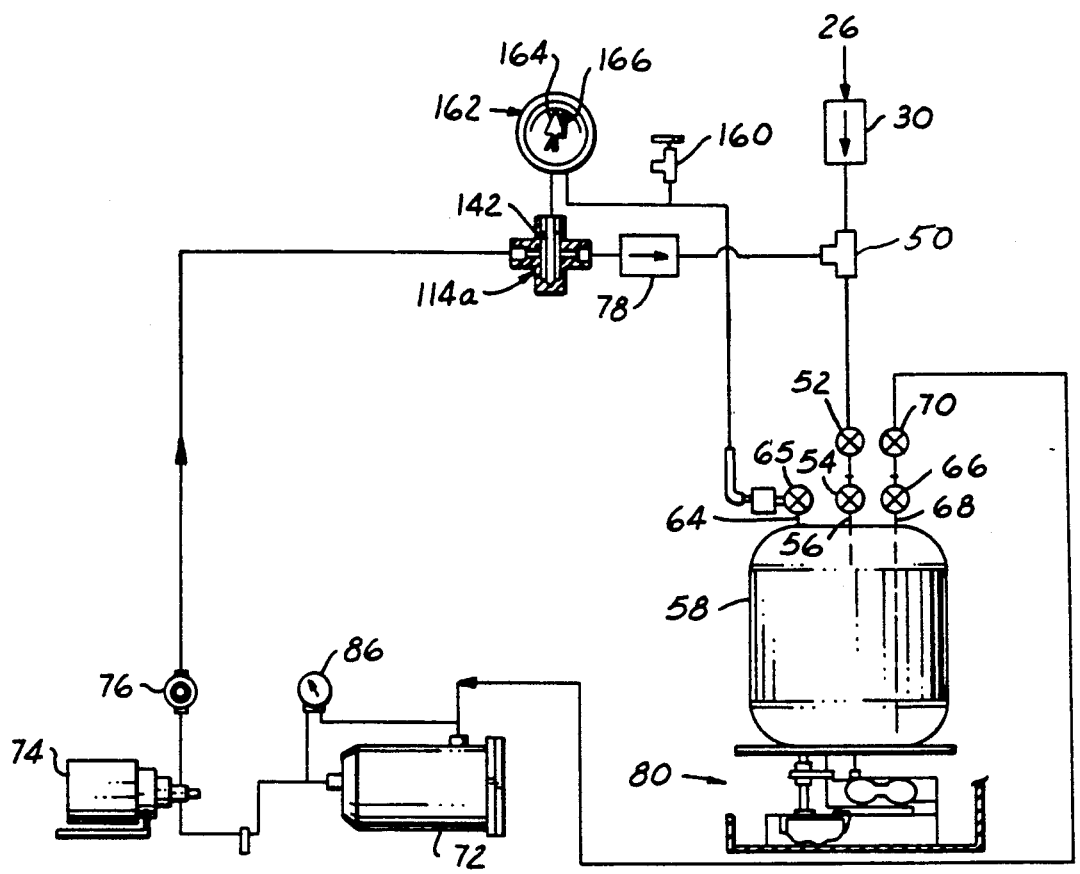
FIGS. 4 and 5 are fragmentary schematic diagrams that illustrate respective modified embodiments of the invention.

FIG. 4 illustrates a modified embodiment of the invention in which the automatic purge valve 100 of FIGS. 1 and 3 or 100a of FIG. 2 is replace by a manual valve 160 connected between purge port 64 on container 58 and one pressure input of a differential pressure gauge 162. The second input to gauge 162 is connected to bulb 142 of saturation pressure sensing chamber 114a. Gauge 162 has a pair of pressure-indicating needles 164, 166, which may be connected to associated bourdon tubes or the like, for respectively indicating pressures at the corresponding gauge inputs. Thus, an operator determines the pressure differential between the refrigerant saturation pressure and the container air pressure by observing the needles 164, 166 and the differential-indicating separation therebetween. When such pressure differential exceeds the desired threshold, the operator opens valve 160 for venting the air to atmosphere.

Figure 5:
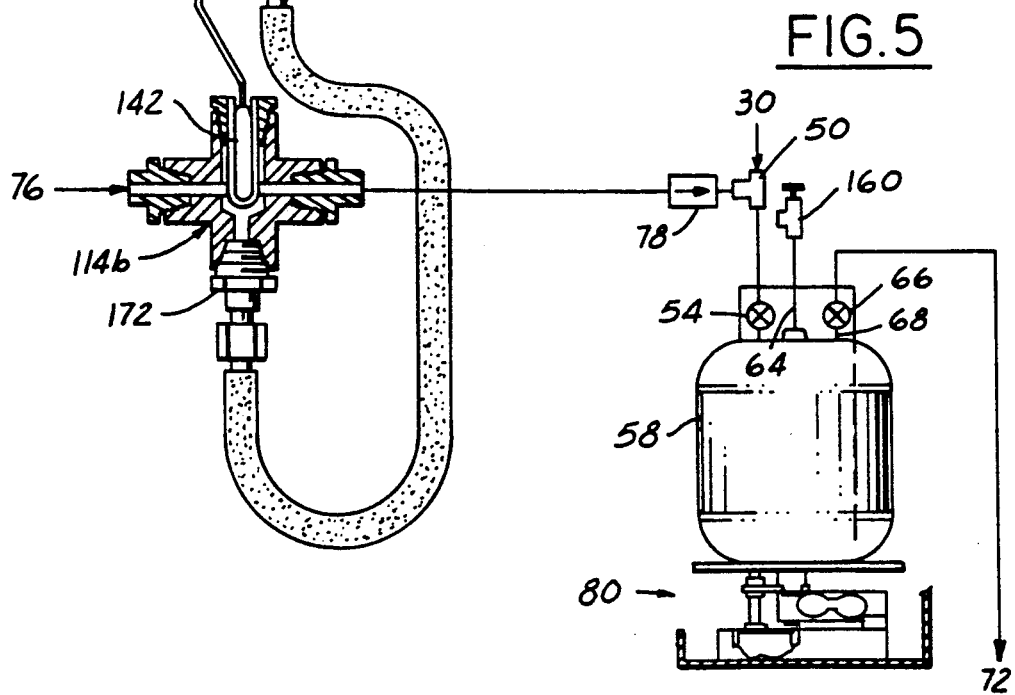

FIG. 5 illustrates another modified embodiment of the invention in which a single-needle pressure differential gauge 170 has a first input connected to bulb 142 in a modified chamber 114b. A second input to gauge 170 is coupled to a fitting 172 on chamber 114b for providing a pressure corresponding to air pressure within container 58. The needle 174 on gauge 170 indicates pressure differential between the respective inputs. When the pressure differential exceeds the desired threshold, such as 10 psi as illustrated in FIG. 5, the manual valve 160 coupled to purge port 64 of container 58 is opened by the operator. In both of the embodiments of FIGS. 4 and 5, the manual valve is closed by the operator when the gauge 162 or 170 indicates a decrease in pressure differential well below the corresponding threshold.

I claimed:

1. In a refrigerant handling system that includes a refrigerant storage container having separate liquid, vapor and purge ports and means releasably connected to said container for feeding liquid refrigerant to said vapor port so as to capture air in said container over said refrigerant, said refrigerant being characterized by a liquid/vapor saturation pressure that varies as a function of refrigerant temperature, means coupled to said purge port for purging air captured in said container comprising:
   means positioned externally of said container and coupled to said liquid feeding means for heat transfer contact with liquid refrigerant passing through feeding means to said container and responsive to temperature of liquid refrigerant in said feeding means as a measure of saturation pressure thereof,
   means coupled to said temperature-responsive means and to said container for determining a pressure differential of air in said container over said saturation pressure, which varies as a function of quantity of air captured in said container, and
   means coupled to said container purge port for venting air in said container when said pressure differential exceeds a preselected threshold.

2. The system set forth in claim 1 for handling refrigerant of a predetermined type, wherein said temperature-responsive means comprises a closed volume of refrigerant of the same said predetermined type, and means coupled to said refrigerant-feeding means for passing refrigerant in heat-transfer contact with said closed volume such that pressure of refrigerant in said closed volume varies as a direct function of said saturation pressure.

3. The system set forth in claim 2 wherein said pressure-differential determining means and said venting means comprise a differential valve having an inlet coupled to said container purge port, means coupled to said closed volume and responsive to said saturation pressure, an outlet, and means for connecting said inlet to said outlet as a function of a pressure differential between said inlet and said saturation pressure.

4. The system set forth in claim 3 wherein said connecting means includes a passage between said inlet and said outlet, a valve seat in said passage, a diaphragm, means for feeding fluid at said inlet and said saturation pressure to opposed sides of said diaphragm, and a valve element coupled to said diaphragm for engagement with said seat.

5. The system set forth in claim 4 wherein fluid at said inlet and said saturation pressures are fed to said diaphragm such that said saturation pressure urges said valve element against said seat.

6. The system set forth in claim 5 wherein said valve further includes spring means coupled to said valve element for resiliently urging said valve element against said seat, such that said threshold pressure differential is determined by said spring means.

7. The system set forth in claim 2 wherein said means coupled to said temperature-responsive means and to said container comprises a pressure gauge including means for indicating said pressure differential to an operator.

8. The system set forth in claim 7 wherein said venting means comprises a manual valve.

9. A system for purification of refrigerant within a storage container that includes means for removing contaminates from refrigerant passing therethrough, refrigerant pump means, means for releasably connecting said pump means and said contaminant-removing means to said container to circulate refrigerant in a closed path from said container to said contaminant-removing means and returning said refrigerant to said container, said refrigerant being in liquid phase in at least a portion of said closed path, and means for purging air captured within said container comprising:
   means positioned externally of said container responsive to temperature of said refrigerant in liquid phase as a measure of saturation pressure of said refrigerant,
   means coupled to said temperature-responsive means and to said container for determining a pressure differential between air in said container and said saturation pressure, and
   means coupled to said container and to said differential-determining means for venting air in said container when said pressure differential exceeds a predetermined threshold.

10. The system set forth in claim 9 wherein said pressure-differential determining means and said venting means together comprise a pressure differential valve having an inlet coupled to said container for receiving air captured in said container, an outlet, and means for connecting said inlet to said outlet as a function of a pressure differential between said inlet and said saturation pressure.

11. The system set forth in claim 10 wherein said connecting means includes a passage between said inlet and said outlet, a valve seat in said passage, a diaphragm, means for feeding fluid at said inlet and said saturation pressure to opposed sides of said diaphragm, and a valve element coupled to said diaphragm for engagement with said seat.

12. The system set forth in claim 11 wherein said temperature-responsive means comprises a closed volume of refrigerant, and means coupled to said pump for passing said refrigerant in liquid phase in heat-transfer relationship with refrigerant in said closed volume.

13. The system set forth in claim 12 wherein said inlet and said closed volume are coupled to said diaphragm such that pressure at said closed volume urges said valve element against said seat.

14. The system set forth in claim 13 wherein said valve further includes spring means coupled to said valve element for resiliently urging said valve element against said seat, such that said threshold pressure differential is determined by said spring means.

15. The system set forth in claim 10 wherein said temperature-responsive means comprises a closed volume of refrigerant, and means coupled to said pump for passing said refrigerant in liquid phase in heat-transfer relationship with refrigerant in said closed volume.

16. The system set forth in claim 15 for purifying refrigerant of a predetermined type, wherein said temperature-responsive means comprises a closed volume of refrigerant of the same said predetermined type, and means coupled to said refrigerant-feeding means for passing said refrigerant in liquid phase in heat-transfer contact with said closed volume such that pressure of said refrigerant in said closed volume varies as a direct function of said saturation pressure.

17. The system set forth in claim 9 for purifying refrigerant of a predetermined type, wherein said temperature-responsive means comprises a closed volume of refrigerant of the same said predetermined type, and means coupled to said refrigerant-feeding means for passing said refrigerant in liquid phase in heat-transfer contact with said closed volume such that pressure of said refrigerant in said closed volume varies as a direct function of said saturation pressure.

18. The system set forth in claim 9 wherein said pressure-differential determining means comprises a pressure differential gauge coupled to said temperature-responsive means and to said container, including means for indicating said pressure differential to an operator, and wherein said venting means comprises a manual valve coupled to said container.

* * * * *